(12) United States Patent
Monkowski

(10) Patent No.: US 7,412,377 B2
(45) Date of Patent: Aug. 12, 2008

(54) VOICE MODEL FOR SPEECH PROCESSING BASED ON ORDERED AVERAGE RANKS OF SPECTRAL FEATURES

(75) Inventor: Michael D. Monkowski, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 10/740,661

(22) Filed: Dec. 19, 2003

(65) Prior Publication Data

US 2005/0137862 A1 Jun. 23, 2005

(51) Int. Cl.
*G10L 19/02* (2006.01)
(52) U.S. Cl. ........................... 704/206; 704/205
(58) Field of Classification Search ............... 704/205, 704/206

See application file for complete search history.

(56) References Cited

U.S. PATENT DOCUMENTS

| | | | |
|---|---|---|---|
| 4,624,012 | A | 11/1986 | Lin et al. |
| 5,113,449 | A | 5/1992 | Blanton et al. |
| 5,165,008 | A | 11/1992 | Hermansky et al. |
| 5,195,167 | A | 3/1993 | Bahl et al. |
| 5,230,037 | A | 7/1993 | Giustiniani et al. |
| 5,307,442 | A | 4/1994 | Abe et al. |
| 5,327,521 | A | 7/1994 | Savic et al. |
| 5,455,889 | A | 10/1995 | Bahl et al. |
| 5,696,879 | A | 12/1997 | Cline et al. |
| 5,749,073 | A | 5/1998 | Slaney |
| 5,750,912 | A | 5/1998 | Matsumoto |
| 5,847,303 | A | 12/1998 | Matsumoto |
| 5,933,805 | A | 8/1999 | Boss et al. |
| 6,336,092 | B1 | 1/2002 | Gibson et al. |
| 6,463,412 | B1 | 10/2002 | Baumgartner et al. |
| 2001/0056347 | A1 | 12/2001 | Chazon et al. |
| 2003/0088402 | A1 | 5/2003 | Hoory et al. |

FOREIGN PATENT DOCUMENTS

WO WO 92/15150 * 9/1992

OTHER PUBLICATIONS

Douglas F. Levinson et al. "Genome Scan Meta-Analysis of Schizophrenia and Bipolar Disorder, Part I: Methods and Power Analysis", Am. J. Human Genetics, vol. 73, p. 17-33, Jun. 11, 2003.*
Thomas P. Hettmansperger "Non-Parametric Inference for Ordered Alternatives in a Randomized Block Design," Psychometrica, vol. 40, No. 1, Mar. 1975.*
J. H. F. Meyer et al. "Study orchestratioin and learning outcome: evidence of association over time among disadvantaged students", Higher Education, vol. 20, p. 245-269, 1990.*
David A. Hull, "Stemming Algorithms: A Case Study for Detailed Evaluation," J. Am. Soc. Info. Sci., vol. 47, No. 1, p. 70-84, 1996.*
LR Bahl, F. Jelinek and R. Mercer, "A Maximum Likelihood Approach to Continuous Speech Recognition", IEEE Transactions on Pattern Analysis and Machine Intelligence, vol. PAMI-5, No. 2, Mar. 1983.
LR Rabiner and BH Juang, "An Introduction to Hidden Markov Models", IEEE ASSP Magazine (3), pp. 4-16, Jan. 1986.

* cited by examiner

*Primary Examiner*—Talivaldis Ivars Smits
(74) *Attorney, Agent, or Firm*—Ference & Associates LLC

(57) ABSTRACT

Methods and arrangements for generating a voice model in speech processing. Upon accepting at least two input vectors with spectral features, vectors of ranks are created via ranking values of the spectral features of each input vector, ordered vectors are created via arranging the values of each input vector according to rank, and a vector of ordered average values is created via determining the average of corresponding values of the ordered vectors. Thence, a vector of ordered average ranks is created via determining the sum or average of the vectors of ranks, a vector of ordered ranks is created via ranking the values of the ordered average ranks and a spectral feature vector is created via employing the rank order represented by the vector of ordered ranks to reorder the vector of ordered average ranks.

15 Claims, No Drawings

VOICE MODEL FOR SPEECH PROCESSING BASED ON ORDERED AVERAGE RANKS OF SPECTRAL FEATURES

FIELD OF THE INVENTION

The present invention relates to methods and arrangements for generating a compact model of one or more speakers voice and using the same in speech synthesis, speech coding, voice transformation, and voice "morphing".

BACKGROUND OF THE INVENTION

Text-to-speech systems generally include two parts; the first typically takes text as input and generates phonetic and prosodic sequences as output, and the second, the synthesis step, typically takes the phonetic and prosodic sequences as input and generates audio as output. Several efforts have historically been made in connection with the second part, but room for improvement continually exists.

Speech synthesis today is mainly done by one of two methods, either formant synthesis or concatenative speech synthesis. Formant systems are small, but require considerable tuning to achieve acceptable quality, and cannot be automatically matched to a reference voice. Concatenative systems can be automatically trained to match a reference voice, but must be quite large to provide acceptable quality, and require a complex dynamic programming process to generate the audio. A need has therefore been recognized in connection with providing an arrangement that is small, fast, and can be easily trained to match a reference voice.

U.S. Pat. No. 5,230,037 ("Phonetic Hidden Markov Model Speech Synthesizer"; Giustiniani et al.) relates to a system for speech synthesis that uses sequences of feature vectors chosen from a model set as the basis for synthesizing speech. The feature vectors, however, are computed by simple averaging over all instances for each model vector. This has the disadvantage of "smearing" the spectra, resulting in distorted audio upon generation.

Systems for altering voice characteristics, such as U.S. Pat. No. 4,624,012 ("Method and Apparatus for Converting Voice Characteristics of Synthesized Speech"; Lin et al.) and U.S. Pat. No. 5,113,449 ("Method and Apparatus for Altering Voice Characteristics of Synthesized Speech"; Blanton et al.) rely on modifications of the sampled audio to produce a voice that sounds different, but the types of differences are limited, and they cannot be directed to contain particular desired characteristics. The system for voice transformation discussed in U.S. Pat. No. 5,847,303 ("Voice Processor with Adaptive Configuration by Parameter"; Matsumoto) discusses subject matter similar to the Lin et al. and Blanton et al. patents, but uses a set of global parameters estimated from a target speaker to perform the transformation. Similarly to those patents, however, the changes are not specific to particular sounds, and so are limited.

Some systems for voice transformation use the spectral envelope of the source speaker together with the excitation signal component of the target individual to generate the target signal, for example, U.S. Pat. No. 5,165,008 ("Speech Synthesis Using Perceptual Linear Prediction Parameters"; Hermansky et al.) and U.S. Pat. No. 6,336,092 ("Targeted Vocal Transformation"; Gibson et al.) which, like Matsumoto, infra, discusses a limited global transformation.

In another system, spectral equalization is performed based on parallel utterances by the source and target speaker (U.S. Pat. No. 5,750,912, "Formant Converting Apparatus Modifying Singing Voice to Emulate Model Voice"; Matsumoto) but, here, novel utterances are not allowed for.

Other systems use sets of model vectors taken from individual instances of training data, for example, as discussed in U.S. Pat. No. 5,307,442 ("Method and Apparatus for Speaker Individuality Conversion"; Abe et al.), U.S. Pat. No. 5,327,521: "Speech Transformation System"; Savic et al.) and U.S. Pat. No. 6,463,412: "High Performance Voice Transformation Apparatus and Method"; Baumgartner et al.). As a result, the model vectors are subject to noise and variations in the reference speakers' performance, thereby degrading the smoothness of the generated audio.

Some voice coding systems also use model vectors taken from individual instances of training data, for example U.S. Pat. No. 5,696,879 ("Method and Apparatus for Improved Voice Transmission"; Cline et al.) and U.S. Pat. No. 5,933,805 ("Retaining Prosody during Speech Analysis for Later Playback"; Boss et al.); the same limitations as with Abe et al., Savic et al., and Baumgartner et al. (all supra) are thus apparent.

One method of voice morphing, as discussed in U.S. Pat. No. 5,749,073 ("System for Automatically Morphing Audio Information"; Slaney) uses a dynamic time warp to align parallel utterances which are interpolated using either cross-fading or a dynamic frequency warping. Cross-fading, however, does not blend the voices, but only overlaps them. Dynamic frequency warping does blend the voices, but the process is complex.

In view of the foregoing, a need has been recognized in connection with improving upon the shortcomings and disadvantages of prior efforts.

SUMMARY OF THE INVENTION

In summary, one aspect of the invention provides a method of generating a spectral feature vector, the method comprising the steps of: accepting at least two input vectors, each input vector including spectral features; creating vectors of ranks via ranking values of the spectral features of each input vector; creating ordered vectors via arranging the values of each input vector according to rank; creating a vector of ordered average values via determining the average of corresponding values of the ordered vectors; creating a vector of ordered average ranks via determining the sum or average of the vectors of ranks; creating a vector of ordered ranks via ranking the values of the ordered average ranks; creating a spectral feature vector via employing the rank order represented by the vector of ordered ranks to reorder the vector of ordered average ranks.

Another aspect of the present invention provides an apparatus for generating a spectral feature vector, the apparatus comprising: an arrangement for accepting at least two input vectors, each input vector including spectral features; an arrangement for creating vectors of ranks via ranking values of the spectral features of each input vector; an arrangement for creating ordered vectors via arranging the values of each input vector according to rank; an arrangement for creating a vector of ordered average values via determining the average of corresponding values of the ordered vectors; an arrangement for creating a vector of ordered average ranks via determining the sum or average of the vectors of ranks; an arrangement for creating a vector of ordered ranks via ranking the values of the ordered average ranks; an arrangement for creating a spectral feature vector via employing the rank order represented by the vector of ordered ranks to reorder the vector of ordered average ranks.

Furthermore, an additional aspect of the invention provides a program storage device readable by machine, tangibly embodying a program of instructions executable by the machine to perform method steps for generating a spectral feature vector, the method comprising the steps of: accepting at least two input vectors, each input vector including spectral features; creating vectors of ranks via ranking values of the spectral features of each input vector; creating ordered vectors via arranging the values of each input vector according to rank; creating a vector of ordered average values via determining the average of corresponding values of the ordered vectors; creating a vector of ordered average ranks via determining the sum or average of the vectors of ranks; creating a vector of ordered ranks via ranking the values of the ordered average ranks; creating a spectral feature vector via employing the rank order represented by the vector of ordered ranks to reorder the vector of ordered average ranks.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

In accordance with at least one presently preferred embodiment of the present invention, a synthesis process can be divided into two parts. The first generates feature vectors from the phonetic and prosodic input, and the second generates audio from the feature vectors. This second part is accomplished through the method of cepstra regeneration, and in particular uses the "RecoVC" algorithm; this is discussed in copending and commonly assigned U.S. patent application Ser. No. 09/432,081, "Method and system for speech reconstruction from speech recognition features", filed Nov. 2, 1999, and United States Published Patent Application No. 20030088402 (Hoory, Ron et al.; "Method and system for low bit rate speech coding with speech recognition features and pitch providing reconstruction of the spectral envelope").

In accordance with at least one presently preferred embodiment of the present invention, the first part of the synthesis process is addressed, that is, the generation of the feature vectors. Currently, this is done for the RecoVC process using a method very similar to concatenative speech synthesis, as discussed in United States Published Patent Application No. 20010056347 (Chazan, Dan et al.; Dec. 27, 2001; "Feature-domain concatenative speech synthesis"). This method, however, suffers from many of the drawbacks of the basic concatenative TTS systems. It uses representations of individual utterances as its basic building blocks, and has a large inventory of these which are concatenated using a dynamic programming algorithm.

In a probabilistic approach to speech recognition, a finite set of models is defined. Each model is a Markov model, or a probabilistic finite-state phone machine. This technique is discussed in articles such as "A Maximum Likelihood Approach to Continuous Speech Recognition", IEEE Transactions on Pattern Analysis and Machine Intelligence, volume PAMI-5, Number 2, March 1983, by L. R. Bahl, F. Jelinek, and R. L. Mercer.

In accordance with a preferred embodiment of the present invention, only one model vector per context dependent phonetic or sub-phonetic state is used, which is trained on multiple utterances of the corresponding sound. This makes the model less susceptible to noise and random variations in the speaker's performance. Preferably, the process uses a decision tree as described in U.S. Pat. No. 5,195,167 ("Apparatus and Method of Grouping Utterances of a Phoneme into Context-Dependent Categories Based on Sound-Similarity for Automatic Speech Recognition"; Bahl, Lalit et al) together with the "Forward-Backward Algorithm" for training. (See, for example, L. R. Rabiner and B. H. Juang, "An Introduction to Hidden Markov Models", IEEE ASSP Magazine (3) pp. 4-16, January 1986.) The process of generating a sequence of feature vectors, given the prosody and phonetic sequence, is then a simple lookup for the model vector corresponding to each context dependent sub-phone unit, and applying smoothing to the transitions, if desired.

In addition to text-to-speech, the presently contemplated process can be used to do voice transformation by extracting the prosody and phonetic sequence from an utterance, and replacing the spectral components while maintaining the prosodic information. The result sounds like a different speaker saying exactly the same thing in exactly the same tone of voice. Video games or movies may also be able to make use of speech morphing in conjunction with video morphing, beginning either with the prosody generated by a text-to-speech process or with the prosody of a recorded utterance.

The model could also be used as a codebook for speech compression. The sequence of context dependent sub-phone units could be determined by speech recognition, by standard vector quantization techniques, or by a vector quantization technique that is constrained by phonetic context, such as in U.S. Pat. No. 5,455,889 ("Labelling Speech Using Context-dependent Acoustic Prototypes"; Bahl, Lalit R. et al.)

In accordance with at least one preferred embodiment of the present invention, a tremendous difference from prior efforts lies in a method of accumulating the statistics for the model vectors and a method of manipulating the model vectors to generate the sequence of feature vectors from which the audio is generated; key to this is a process that may be termed "rank averaging", discussed herebelow.

Typically, when building models for speech recognition, statistics are accumulated to be used for computing the means, variances, and prior probabilities of Gaussian distributions that represent prototypes for feature vectors belonging to a particular context dependent sub-phonetic phone. If one uses the means of these prototypes to generate the feature vectors for RecoVC, the resulting audio sounds muffled, because the process of averaging to generate the mean effectively broadens the formants of the speech spectra. It is not possible to modify the means to narrow the formants, because the degree of broadening depends on the amount of variation in the position of the formants among the vectors of the training data, and this information is not recoverable from the accumulated statistics.

The spectral features for speech recognition are typically represented as mel frequency cepstra. A Fourier transform is applied to a short windowed segment of speech audio to generate a Fourier spectrum. The spectrum is binned into channels of approximately equal width in terms of mel frequency. The logarithm of each channel is computed, and then a cosine transform is used to compute the cepstra. The cepstra coefficients are the values that are accumulated in the training process to generate the Gaussian prototypes.

For rank averaging, however, the cosine transform is preferably not used, but instead the mel log spectra is preferably used directly. In a working example to now be discussed, 5 mel bins will be used, but 24 is a more typical number of mel bins to be used in actual practice. For each feature vector in the training, the Forward-Backward algorithm provides probabilities that each vector belongs to particular context dependent sub-phone units. These probabilities are then used as weights for accumulating statistics, per the usual practice of applying the aforementioned "Forward-Backward" algorithm to the generation of an acoustic model for speech recognition.

Before accumulating statistics, however, the mel bins are preferably sorted to provide a set of ranks and values. The values are the original set of 24 values ordered in ascending (or descending) order. The ranks are 5 values, typically 1 to 5, but any linear set of values will do, ordered such that the lowest value is placed in the position of the mel bin that had the lowest (or highest) value, the next highest value is placed in the position of the mel bin with the next higher (or lower) value, and so forth until all 5 values are used. For example, given the hypothetical five dimensional mel log spectrum: [40.6 50.3 55.2 45.7 46.2], the sorted values would be [40.6 45.7 46.2 50.3 55.2] and the ranks would be [1 4 5 2 3].

One then preferably weights the sorted values and the ranks by the probabilities for each context dependent sub-phone unit and accumulates these as two sets of five-dimensional sums. One also preferably accumulates the total weight for each context dependent sub-phone unit, as is the usual practice with the aforementioned "Forward-Backward" algorithm.

After all training vectors are processed, one preferably divides the sums for each context dependent sub-phone unit by their corresponding total weights. This yields a five-dimensional vector of average values and a five dimensional vector of average ranks. Suppose in the present example the average values were [41.3 44.2 47.1 52.4 53.9] and the average ranks were [1.7 3.6 4.9 2.6 2.2]. One then preferably sorts the average ranks and determines their own ranks as was done for the training vectors. In this example, the sorted ranks would be [1.7 2.2 2.6 3.6 4.9] and the ranks of the ranks would be [1 5 4 2 3].

This rank ordering of the average ranks is then assigned to the average values, and the average values are reordered accordingly. In the present example, the result would be [41.3 52.4 53.9 47.1 44.2]. This is thus the rank averaged model vector.

The duration of a context dependent sub-phone unit is typically in the range 1 to 5 frames, where the frames are computed every 10 msec. Rather than using the same model vector for all frames of a unit, one can use the rank averaging process to smooth the transition. For example, suppose one had one unit of duration 2 with model vector [40.0 42.5 46.3 50.0 43.6] followed by another unit of duration 3 with model vector [41.3 52.4 53.9 47.1 44.2]. Rather than generating the sequence
  frame 1 [40.0 42.5 46.3 50.0 43.6]
  frame 2 [40.0 42.5 46.3 50.0 43.6]
  frame 3 [41.3 52.4 53.9 47.1 44.2]
  frame 4 [41.3 52.4 53.9 47.1 44.2]
  frame 5 [41.3 52.4 53.9 47.1 44.2]

one could use rank averaging to smooth the vector at frame 3. Here, equal weighting of the two model vectors will be used as an example:
  frame 2: [40.0 42.5 43.6 46.3 50.0] [1 2 5 3 4]
  frame 3: [41.3 44.2 47.1 52.4 53.9] [1 5 4 2 3]
  averaged: [40.7 43.4 45.4 49.4 52.0] [1 3 4.5 4 2.5]
  ranked: [1 3 5 4 2]
  ordered: [40.7 45.4 52.0 49.4 43.4]

to yield:
  frame 1 [40.0 42.5 46.3 50.0 43.6]
  frame 2 [40.0 42.5 46.3 50.0 43.6]
  frame 3 [40.7 45.4 52.0 49.4 43.4]
  frame 4 [41.3 52.4 53.9 47.1 44.2]
  frame 5 [41.3 52.4 53.9 47.1 44.2]

In the same way that model vectors were averaged across time, one could also generate a voice model intermediate between two given models by rank averaging corresponding vectors of each context dependent sub-phone unit, if both primary models were built using the same set of context dependent sub-phone units.

If one uses the same pair of weights for every frame, then the result will sound like a different speaker. If one gradually changes the weights from 100% for one model to 100% for the other model as the frames progress (i.e., to gradually change the relative weights of the models from 100%-0% to 0%-100% through various steps such as 90%-10%, 80%-20%, 70%-30%, etc.), the result will be a "morphing" (to use a visual analogy) of one voice into the other.

In experimentation, a first model was constructed as the average of 42 female speakers and a second model was constructed as the average of 42 male speakers. A synthesis blended between these two models, referred to hereabove as "morphing". Prosody was taken from an utterance by a speaker not in the training set. The spectral features were generated by the process described above.

In recapitulation, there is broadly contemplated in accordance with at least one presently preferred embodiment of the present invention an arrangement for producing a compact voice model from one or more speakers that includes the process of rank averaging to accumulate statistics of spectral dimensions of feature vectors, as well as a method for blending or interpolating those models using rank interpolation to produce models with desired characteristics (for example, anonymity in the case of distinct voices associated with individuals in the entertainment industry, where use of such voices might be proprietary or exclusive and where it thus may be desirable to derive a voice belonging to no particular individual). There is also broadly contemplated herein: the blending of any other spectral models with rank averaging, using a model for speech synthesis, smoothing via rank interpolation across time for synthesis, using a model for speech coding, using a model for voice transformation, and using two models for voice morphing.

In further elaboration, morphing may be carried out using rank interpolation of models that use any other spectral representation. Morphing or blending may be carried out using rank interpolation between a model and spectral vectors derived for each time frame of real sampled audio using a speaker independent alignment. (A speaker-dependent model for the speaker of the real sampled audio is not necessary in this case.) Morphing or blending may be carried out using rank interpolation within corresponding phonetic or sub-phonetic units for spectral vectors derived for each time frame of real sampled audio from parallel utterances using a speaker independent alignments. (Speaker-dependent models are also not necessary in this case.)

Feature vectors may be used that contain the ranks and values of spectral features to make probability distributions to be used as models for speech recognition. Optionally, this could also be done for time derivatives of the spectral representations.

It is to be understood that the present invention, in accordance with at least one presently preferred embodiment, includes an arrangement for accepting at least two input vectors, an arrangement for creating vectors of ranks, an arrangement for creating ordered vectors, an arrangement for creating a vector of ordered average values, an arrangement for creating a vector of ordered average ranks, an arrangement for creating a vector of ordered ranks, and an arrangement for creating a spectral feature vector. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein , it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of using a computer processor configured for executing operations on encoded computer program instructions stored in computer memory and arranged for generating a spectral feature vector data output, said method comprising the steps of:
   accepting at least two input vectors, each input vector including speech or audio or voice spectral features;
   creating vectors of ranks via ranking values of the spectral features of each input vector;
   creating ordered vectors via arranging the values of each input vector according to rank;
   creating a vector of ordered average values via determining the average of corresponding values of the ordered vectors;
   creating a vector of ordered average ranks via determining the sum or average of the vectors of ranks;
   creating a vector of ordered ranks via ranking the values of the ordered average ranks;
   creating a spectral feature vector via employing the rank order represented by the vector of ordered ranks to reorder the vector of ordered average values.

2. The method according to claim 1, further comprising:
   accepting speech or audio or voice input;
   said step of accepting at least two input vectors comprises developing input vectors associated with the speech or audio or voice input spectral features;
   said method further comprising the step of providing probabilities that each input vector belongs to one or more classes;
   said steps of creating a vector of ordered average values and creating a vector of ordered average ranks comprising assigning the probabilities as weights to the input vectors; and
   said method further comprising the step of developing a voice model based on the spectral feature vector.

3. The method according to claim 2, wherein said step of providing probabilities comprises providing probabilities that each vector belongs to particular context-dependent sub-phone units.

4. The method according to claim 2, further comprising:
   generating mel frequency log spectra associated with the speech or audio or voice input;
   said step of generating mel frequency log spectra comprising:
      segmenting the speech or audio or voice input into a plurality of segments;
      applying a Fourier transform and generating a Fourier spectrum for each segment;
      binning the Fourier spectrum into channels based on mel frequency; and
      determining the logarithm of each channel.

5. The method according to claim 4, wherein:
   said steps of creating vectors of ranks and creating ordered vectors comprise sorting the mel bins to provide a set of ranks and values;
   said step of assigning probabilities as weights comprising weighting the sorted values and ranks with the weights and accumulating the weighted ranks and weights as two sets of n-dimensional sums, and developing a total weight for each context-dependent sub-phone unit; and
   said steps of creating a vector of ordered average values and creating a vector of ordered average ranks comprising dividing the sums corresponding to each context-dependent sub-phone unit by corresponding total weights to yield a n-dimensional vector of average values and a vector of average ranks.

6. The method according to claim 4, wherein the input is speech input.

7. The method according to claim 6, wherein said step of providing probabilities comprises:
   determining the probabilities via providing a transcription of the audio input;
   expanding words associated with the transcription into phonetic sequences;
   joining the phonetic sequences based on a word sequence of the transcription; and
   determining context-dependent sub-phonetic units for each phone and employing a speech recognition model to align the result with the segmented audio input.

8. The method accordfng to claim 2, wherein said at least two input vectors correspond to at least two voice models, whereby said method is adapted for creating from at least two voice models an additional voice model having predetermined characteristics.

9. The method according to claim 2, wherein the voice model is used as a vector quantization codebook for speech coding.

10. The method according to claim 2, wherein the voice model is employed in voice transformation via regenerating speech from a sequence of model vectors corresponding to the time sequence of classes corresponding to the audio input.

11. The method according to claim 2, wherein the voice model is used for voice morphing via:
   determining at least one time sequence of classes corresponding to the input speech;
   determining a time varying weighted average of spectral feature vectors of
      at least two voice models; or
      at least one input vector and at least one voice model; and
   regenerating speech from the resulting sequence.

12. The method according to claim 2, wherein the voice model is used for speech synthesis via:
   expanding a sequence of words into phonetic sequences;
   joining the phonetic sequences based on a word sequence;
   expanding the phonetic sequence into one or more classes;
   sequencing vectors associated with the voice model according to a class sequence, and
   generating speech from the resulting sequence.

13. The method according to claim 1, wherein said at least two input vectors correspond to at least two spectral models, whereby said method is adapted for creating from at least two spectral models an additional spectral model having predetermined characteristics.

14. The method according to claim 1, wherein said method is adapted for voice morphing via:

determining a first time sequence of classes corresponding to one instance of input speech;

determining a second time sequence of classes corresponding to another instance of input speech;

determining a time-varying weighted average of the vectors of corresponding classes; and regenerating speech from the resulting sequence.

15. The method according to claim 1, wherein:

the set of input vectors is a contiguous set of vectors taken from a time sequence of spectral feature vectors; and said method further comprises the step of assigning weights for averaging based on the relative position in time of the input spectral feature vectors.

\* \* \* \* \*